March 8, 1927.

W. J. JONES

STONE AND MARBLE SAW

Filed May 23, 1925

Inventor
William J. Jones
By C.A. Snow & Co.
Attorneys

March 8, 1927. 1,620,466

W. J. JONES

STONE AND MARBLE SAW

Filed May 23, 1925    2 Sheets-Sheet 2

Inventor
William J. Jones
By C. A. Snow & Co.
Attorneys

Patented Mar. 8, 1927.

1,620,466

UNITED STATES PATENT OFFICE.

WILLIAM JOHN JONES, OF CARTHAGE, MISSOURI.

STONE AND MARBLE SAW.

Application filed May 23, 1925. Serial No. 32,468.

This invention relates to a portable self-contained saw, the primary object of the invention being to provide a saw of this character especially designed for use in sawing stone and marble, at the place where it is being used in building.

Another object of the invention is the provision of a device of this character including a tank which may contain water to facilitate the operation of the saw, the tank acting as a housing for the saw and motor, when it is desired to move the device from place to place.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
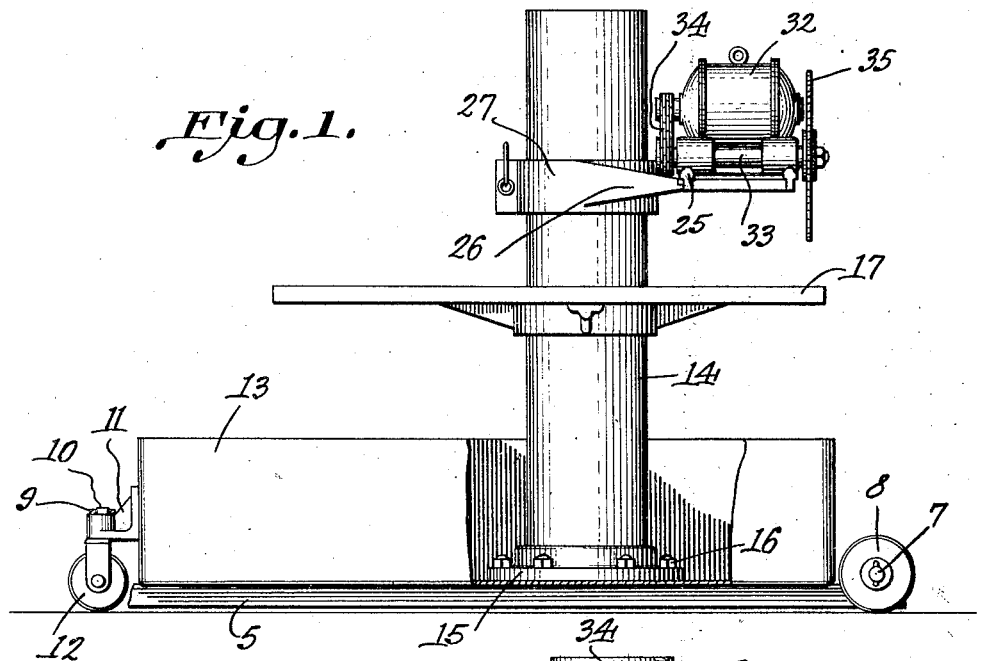
Figure 1 is a side elevational view of a saw constructed in accordance with the invention, a portion of the tank being broken away.
Figure 2:
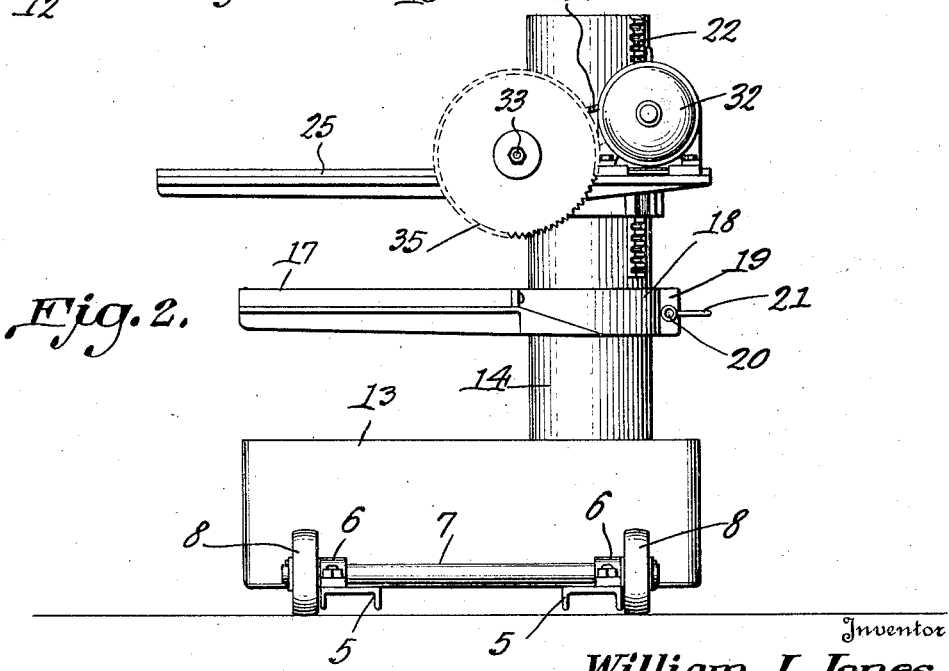
Figure 2 is an end elevational view thereof.
Figure 3:
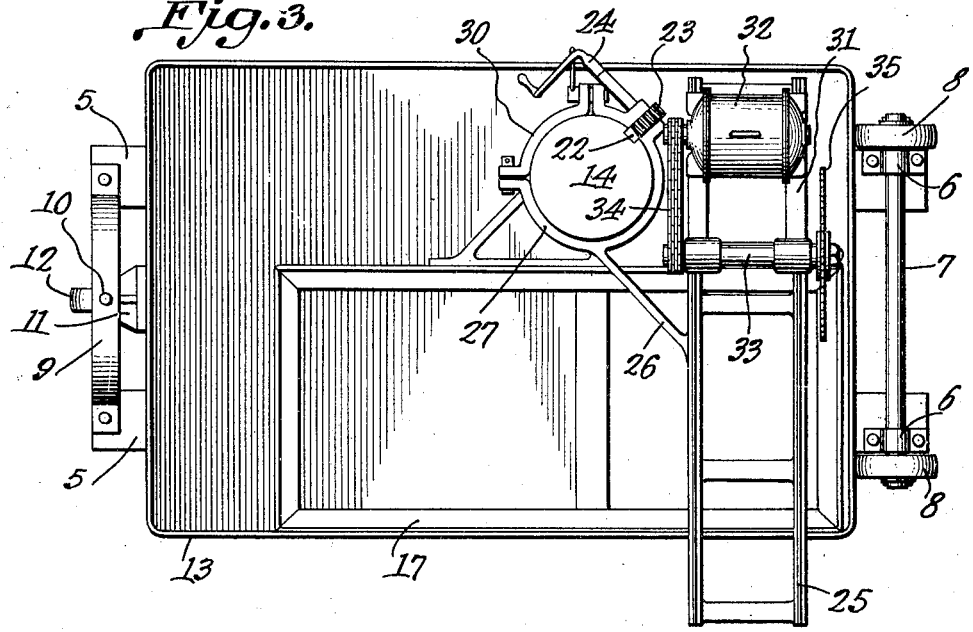
Figure 3 is a plan view thereof.

Referring to the drawings in detail, the supporting frame includes a pair of channel bars 5 which are supplied with bearings 6 to accommodate the axle 7 on which the wheels 8 are mounted.

The opposite ends of the channel bars are connected by means of the curved bearing member 9 which is formed with an opening to accommodate the bolt 10 that extends through the bracket member 11, the bolt and bracket member constituting a support for the wheel 12 whereby the device may be guided.

Mounted on the frame is a rectangular tank 13 which is formed preferably of sheet metal, the same being designed to contain water when the device is in use as a marble saw so that the water may be thrown over the marble to cool the saw and insure the efficient operation thereof. Bolted to the bottom of the tank 13 is a column 14 provided with a flanged base 15 formed with openings to accommodate the bolts 16. Mounted for vertical and horizontal adjustment with respect to the column 14 is a work supporting table 17 which is provided with curved arms 18 provided with flanges 19 having openings to accommodate the bolt 20, nut 21 being provided on the bolt to move the arms 18 towards each other and clamp the column 14 holding the work supporting table 17 in its positions of adjustment.

Secured to the column 14 is a rack bar 22 that cooperates with the pinion 23 carried at one end of the crank shaft 24 so that as the crank shaft 24 is manually rotated, the motor supporting table may be adjusted throughout the length of the column 14.

This motor supporting table includes a track 25 and angularly disposed arms 26 that have connection with the curved clamping member 27 that is designed to embrace a portion of the column 14 to support the table. The curved member also includes a section 30 which is bolted or otherwise secured thereto in such a way that the curved member may be moved into close engagement with the column to hold the motor supporting table in its positions of adjustment after the adjustment has been made by means of the pinion 23 and rack bar 22.

Operating on the track 25 are the motor and saw supporting bars 31, the motor 32 being shown as mounted thereon and designed to supply power to the saw shaft 33 through the medium of the chain 34 running between the motor and saw shaft 33.

The saw which is indicated at 35 is carried at the outer end of the shaft 33 and is so constructed that it will move longitudinally of the track 25 as the same is fed through its work.

Figure 4:
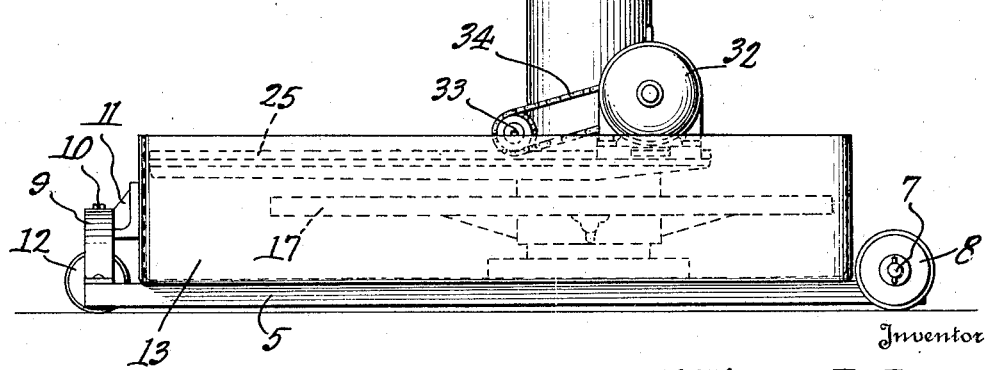
Figure 4 is a side elevational view illustrating the saw and table, as moved to positions within the tank.

From the foregoing it will be seen that due to this construction, the work supporting table 17 and the motor supporting table may be moved from their active positions as shown by Figure 1 of the drawings to a position within the confines of the tank 13, as shown by Figure 4 of the drawings, whereupon the device may be readily moved from place to place.

I claim:—

In a device of the character described, a wheel supported frame, a tank mounted on the frame, said tank adapted to contain water, a column secured within the tank and rising above the upper edge of the tank, a work supporting table adjustably mounted on the column, a rack on the column, a clamping member, arms extending from the clamping member, a track having connection with the arms, a motor and saw mounted on the track and adapted to move longitudinally of the track, a pinion carried by the clamping member and cooperating with the rack for adjusting the clamping member and track longitudinally of the column, and means for clamping the clamping member into close engagement with the column.

In testimony that I claim the foregoing as my own, I have hereto affixed my signature.

WILLIAM JOHN JONES.